United States Patent [19]

Chiba et al.

[11] 3,842,494

[45] Oct. 22, 1974

[54] MULTICHANNEL MAGNETIC FERRITE HEAD AND A METHOD FOR MAKING THE SAME

[75] Inventors: Hiroyuki Chiba, Neyagawa; Elichi Hirota, Sakai; Shoji Nakamura, Hirakata, all of Japan

[73] Assignee: Matsushita Electric Industrial Co., Ltd., Osaka, Japan

[22] Filed: Feb. 26, 1970

[21] Appl. No.: 14,499

[30] Foreign Application Priority Data

| | | |
|---|---|---|
| Mar. 11, 1969 | Japan | 44-19676 |
| Mar. 12, 1969 | Japan | 44-19701 |
| Sept. 1, 1969 | Japan | 44-70422 |
| Sept. 1, 1969 | Japan | 44-70423 |

[52] U.S. Cl. .................... 29/603, 360/120, 360/121

[51] Int. Cl. .......................... G11b 5/26, G11b 5/42

[58] Field of Search ................ 179/100.2 C; 29/603

[56] References Cited

UNITED STATES PATENTS

| | | | |
|---|---|---|---|
| 2,689,274 | 8/1954 | Saeger | 179/100.2 C |
| 3,402,463 | 9/1968 | Bos et al. | 179/100.2 C |
| 3,453,398 | 7/1969 | Manders | 179/100.2 C |

*Primary Examiner*—Raymond F. Cardillo, Jr.
*Attorney, Agent, or Firm*—Wenderoth, Lind and Ponack

[57] ABSTRACT

A multichannel magnetic head consisting essentially of a plurality of magnetic ferrite heads and a plurality of glass spacers filling the spaces between each pair of adjacent magnetic ferrite heads in order to bond said plurality of magnetic ferrite heads into one body. The multichannel head has a high resistance to head-wear and an excellent low cross-talk characteristic and is applicable to various types of multi-track recorders.

3 Claims, 13 Drawing Figures

INVENTORS
HIROYUKI CHIBA
EIICHI HIROTA
SHOJI NAKAMURA

BY *Wenderoth, Lind & Ponack*
ATTORNEYS

INVENTORS
HIROYUKI CHIBA
EIICHI HIROTA
SHOJI NAKAMURA

BY Wenderoth, Lind & Ponack
ATTORNEYS

INVENTORS
HIROYUKI CHIBA
EIICHI HIROTA
SHOJI NAKAMURA

BY Wenderoth, Lind & Ponack
ATTORNEYS

INVENTORS
HIROYUKI CHIBA
EIICHI HIROTA
SHOJI NAKAMURA

BY Wenderoth, Lind & Ponack
ATTORNEY

MULTICHANNEL MAGNETIC FERRITE HEAD AND A METHOD FOR MAKING THE SAME

This invention relates to an annular magnetic head for use in magnetic recording, reproducing and erasing processes and devices. More particularly, the invention relates to an improved multichannel magnetic head composed of a plurality of ferrite magnetic heads and to a method of making it.

A magnetic head consisting of a ferrite material has superior properties with respect to high frequency electrical characteristics and operational life. The ferrite material has superior wear-resistance due to its high hardness and has superior magnetic properties due to its high electrical resistivity in comparison with heads of a metallic material, such as Fe-Ni and Fe-Al-Si-alloys.

The prior literature discloses a multichannel magnetic head consisting of a plurality of closely spaced magnetic heads of ferrite material. A problem exists, however, of how to bond firmly a plurality of ferrite magnetic heads to each other. Poor bonding is responsible for poor wear-resistance of such bonded multichannel magnetic heads. Conventional organic bonding material has a high adhesive force but is not entirely satisfactory with respect to wear and deformation during use.

On the other hand, the operation of a multichannel magnetic head is apt to be impaired by cross-talk. Heretofore, such cross-talk has been reduced by using magnetic shields inserted between two adjacent magnetic heads. As a practical matter, a multichannel magnetic head having magnetic metal as the head tip is usually provided with a thin magnetic metal plate inserted between each two adjacent heads. However, in a multichannel ferrite magnetic head, the use of thin magnetic metal plates for magnetic shields is rather difficult due to the difference in the hardness between magnetic metal plates and the ferrite head tips.

It is an object of the present invention to provide a novel multichannel head having a high resistance to wear and deformation and, therefore, a long operating life.

It is another object of the present invention to provide a novel process for making a multichannel magnetic head having a high resistance to wear and deformation during use.

Further an object of the invention is to provide a novel multichannel head having both a high resistance to wear and improved cross-talk characteristics in which a magnetic shield of ferrite material is provided.

A still further object of the invention is to provide a novel process for making a multichannel magnetic head having a high resistance to wear and improved cross-talk characteristics.

These objects are achieved by providing a multichannel magnetic head which consists essentially of a plurality of ferrite heads and a plurality of glass spacers filling the spaces between each two adjacent ferrite heads in order to bond said plurality of ferrite heads into one body.

The method for making the multichannel magnetic head comprises bonding by using glass-bonding a pair of ferrite blocks having a given cross-section at their polished surfaces so as to form two magnetic gaps; forming a plurality of grooves through the bonded blocks transversely to the bonded surfaces so as to form a plurality of head tips, said plurality of grooves being substantially equidistantly spaced along the bonded block and having equal widths and heights; heating the bonded blocks having said plurality of grooves formed therethrough; filling said plurality of grooves with molten glass which is to act as a plurality of glass spacers; cutting one side of said bonded blocks in a plane in parallel to the bottom face of said plurality of grooves; shaping another side opposed to said one side so as to have a convex surface which acts as a tape engaging surface; dividing the shaped blocks into multichannel magnetic head elements, each of which includes a given number of head tips; and combining said each head tip with a back-core, said back-cores having windings wound thereon.

Other and further features and advantages of the invention will appear from the following description of embodiments thereof, taken in conjunction with the accompanying drawings, in which.

Figure 1:
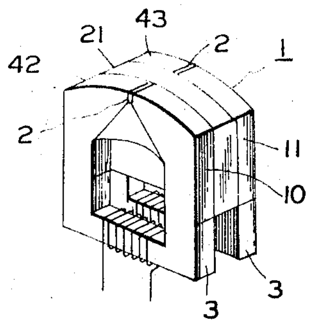
FIG. 1 is a diagrammatic perspective view of a 2-channel magnetic head according to the present invention.

Referring to FIG. 1, reference character 1 designates, as a whole, a two-channel magnetic head consisting essentially of two magnetic ferrite heads 42 and 43 which have a glass spacer 21 partly filling the space therebetween. Said glass spacer 21 bonds said two magnetic ferrite heads 42 and 43 firmly into one body and forms a part of the tape engaging surface of said 2-channel magnetic head in association with said two magnetic ferrite heads 42 and 43. Each of said two magnetic ferrite heads 42 and 43 is composed of head tips 10 and 11 and back-cores 3 which are wound with a coil, and which are joined to each other by any suitable method such as, for example, an adhesive material. Said head tips 10 and 11 are made of a suitable ferrite material and each is provided with a head gap 2 having a gap spacer filling the gap. Said gap spacer is preferably made of glass material. It is important for said 2-channel magnetic head 1 that said glass spacer 21 made of glass material have a hardness and thermal expansion close to those of the ferrite material of said head tips 10 and 11. Such construction gives the tape engaging surface of the 2-channel magnetic head a high resistance to wear and deformation during operation. The permissible difference in the hardness and thermal expansion between said glass spacer 21 and said head tips 10 and 11 is less than 30 percent and preferably less than 15 percent in accordance with the present invention. The hardness of the glass material must be less than that of ferrite material, while the thermal expansion coefficient of the glass material can be higher or lower than that of the ferrite material. It is preferable that the glass composition used in said head gap 2 be substantially the same as or similar to that of said glass spacer 21.

Figure 2:
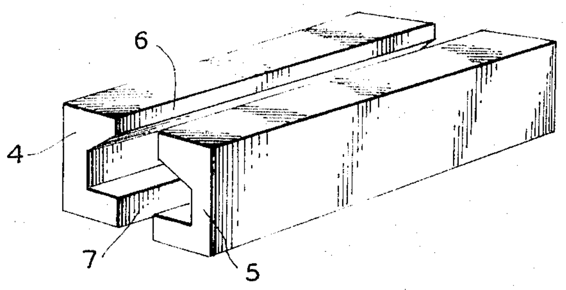
FIG. 2 is a perspective view of a pair of ferrite blocks of a given cross section with their polished surfaces spaced and opposed.
Figure 3:
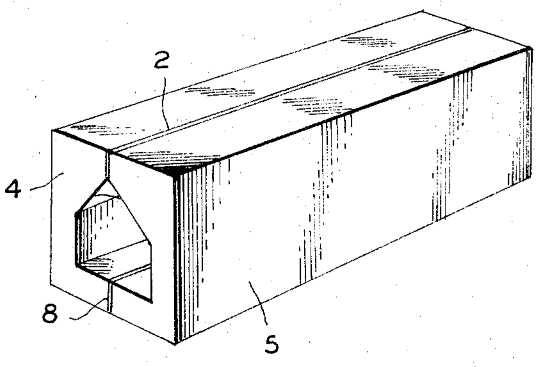
FIG. 3 is a perspective view of the two ferrite blocks of FIG. 2 bonded at their polished surfaces so as to provide two magnetic gaps therebetween at said polished surfaces by using glass-bonding.
Figure 4:
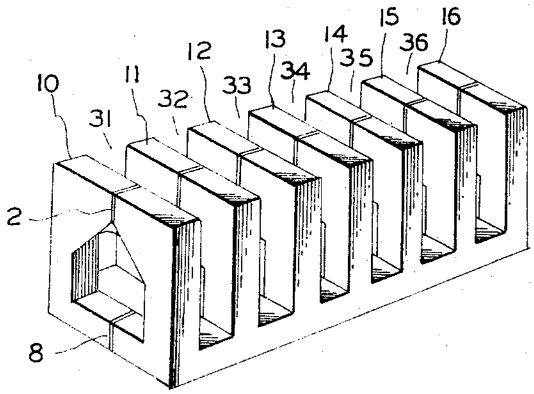
FIG. 4 is a perspective view of the two ferrite blocks bonded together as in FIG. 3 and having a plurality of grooves formed therethrough transversely to the bonded surfaces.

A method for making a multichannel magnetic head according to the invention will be explained with reference to FIGS. 2 to 8. Referring to FIGS. 2 and 3, a pair of ferrite blocks 4 and 5 having the desired cross-section are bonded at their polished surfaces 6 and 7 so as to form two magnetic gaps 2 and 8 by using a commonly known glass-bonding method such as described by H. Chiba et al. in U.S. Pat. application Ser. No. 614,889. As shown in FIG. 4, a plurality of grooves 31, 32, 33 . . . 36 are formed extending through said bonded blocks transversely to the bonded surfaces 2 and 8 so as to form a plurality of head tips 10, 11, 12 . . . 16. Said plurality of grooves 31, 32, 33 . . . 36 are substantially equidistantly spaced along the bonded blocks and have equal widths and heights.

Figure 5:
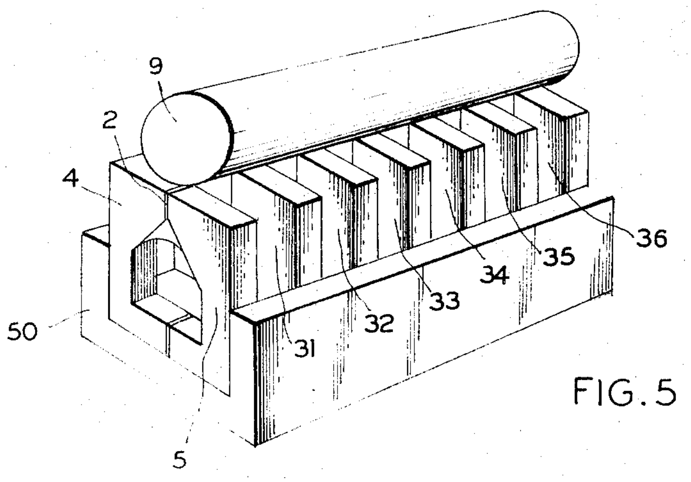
FIG. 5 is a perspective view of the bonded and grooved ferrite blocks of FIG. 4 with a glass rod positioned thereon.

The said bonded and grooved ferrite blocks, having a glass rod 9 positioned thereon as shown in FIG. 5, and while being held firmly in any suitable holder 50, are heated up to a temperature at which the glass rod melts and fills the plurality of said grooves 31, 32 . . . 36. Then said ferrite blocks are cooled to room temperature. The heating temperature depends upon the melting point of the glass of the rod and preferably ranges from 500° to 950°C. If necessary, the heating can be carried out in a nonoxidizing atmosphere, such as nitrogen gas.

Figure 6:
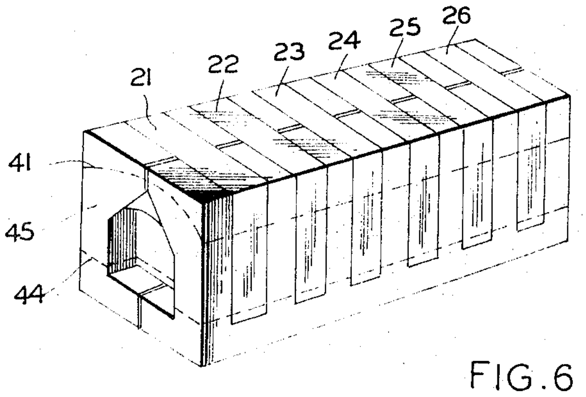
FIG. 6 is a perspective view of said bonded blocks of FIG. 5 with said plurality of transversely formed grooves filled with molten glass which acts as a plurality of glass spacers.
Figure 7:
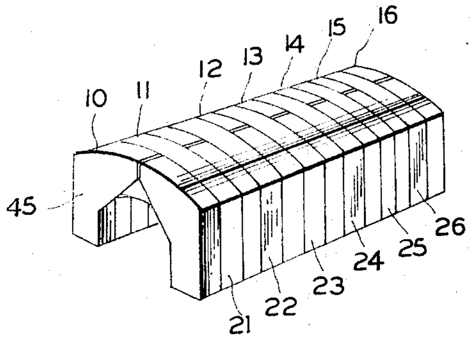
FIG. 7 is a perspective view of said bonded blocks of FIG. 6 having the upper surface shaped in a convex shape which acts as a head track surface.

It is important that the glass rod 9 have a similar thermal expansion coefficient and hardness to those of the ferrite material as mentioned above. Practically, it is very convenient to use the same glass material as that used in the glass-bonding of ferrite blocks 4 and 5. In such a case, the heat-treatment for filling the grooves with glass can be carried out under the same conditions as that for said glass bonding of the ferrite blocks. The glass rod 9 must be set on the grooves. If not, the glass cannot fill the grooves. The molten glass which fills said grooves 31, 32, . . . 36 forms a plurality of glass spacers 21, 22, 23 . . . 26, as shown in FIG. 6. The bonded blocks are cut on one side 44 in a plane in parallel to the bottom face of said plurality of grooves 31, 32, 33 . . . 36 and are shaped on the side 41 opposite said one side 44 so as to have a convex surface which acts as a head tape engaging surface. The part 45 remaining after the cut has a plurality of magnetic head tips 10, 11 . . . 16, which are firmly secured to each other by glass spacers 21, 22 . . . 26, as indicated in FIG. 7. This remaining part is divided into multichannel magnetic head elements each of which includes a given number of head tips. Each of the head tips is combined with a back-core having a winding wound thereon by any suitable and available method. For example, a 2-channel magnetic head element can be obtained by cutting the remaining part 45 into desired pieces each of which includes two head tips 10 and 11 with a glass spacer 21 therebetween.

Figure 8:
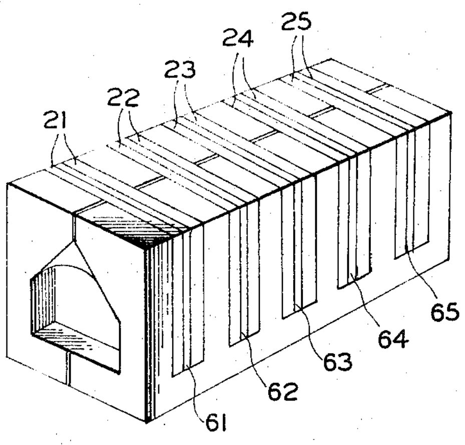
FIG. 8 is a perspective view of said two bonded ferrite blocks having said plurality of glass spacers formed transversely therethrough as in FIG. 6 with a plurality of thin ferrite plates inserted therein.

It has been discovered according to the present invention that a multichannel magnetic head having both a low cross-talk characteristic and high wear-resistance can be prepared by inserting ferrite magnetic shields 61, 62 . . . 65 into said glass spacers 21, 22 . . . 25, as shown in FIG. 8. The material of which said ferrite shields 61, 62 . . . 65 are formed preferably has a magnetic permeability greater than 10,000 and a porosity lower than 0.5 percent.

Figure 9:
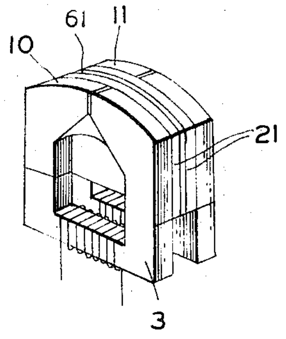
FIG. 9 is a perspective view of a 2-channel magnetic head having a magnetic shield of ferrite material for improving cross-talk characteristics.

Referring to FIG. 8, the insertion of ferrite magnetic shields is accomplished by inserting a plurality of thin ferrite plates 61, 62, 63 . . . 66 into the plurality of grooves 31, 32 . . . 36, which have not yet been filled with glass spacers. Said ferrite plates are substantially equal in height to the depth of said grooves. After insertion, said plurality of grooves each having a thin ferrite plate therein is filled with molten glass by being heated, as explained above. A 2-channel head having a glass spacer with a ferrite magnetic shield is shown in FIG. 9. In this 2-channel magnetic head consisting of two magnetic head tips 10 and 11, a ferrite magnetic shield 61 is positioned between said two magnetic head tips 10 and 11 and extends to the tape engaging surface of the head. Such construction makes it possible to bond the two head tips and the ferrite shield firmly to each other by said spacer 21. This 2-channel magnetic head is characterized by both low cross-talk and high wear-resistance during operation.

Figure 10:
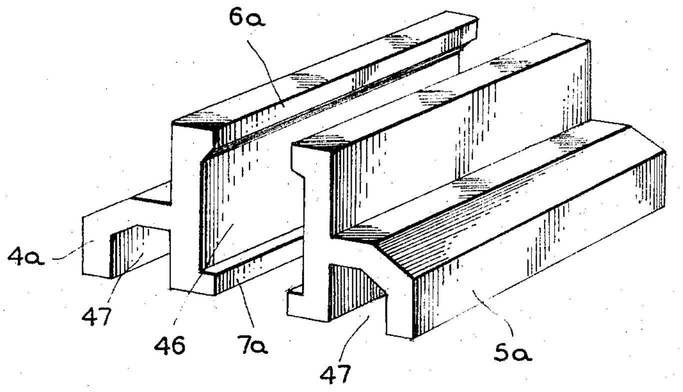
FIG. 10 is a perspective view of an alternative embodiment of two ferrite blocks having a cross-section which includes two hollows.
Figure 11:
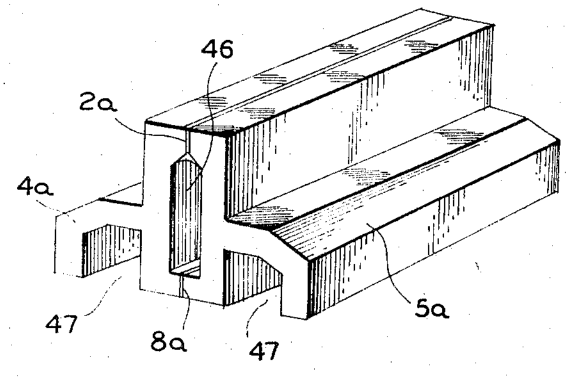
FIG. 11 is a perspective view of the two blocks of FIG. 10 bonded to each other.
Figure 12:
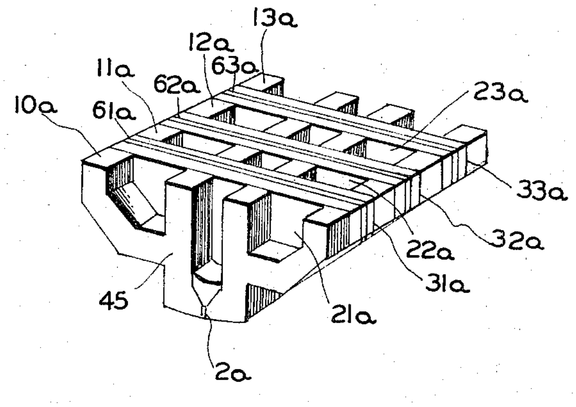
FIG. 12 is a perspective view of a magnetic head tip having four legs before having four wound back cores connected to the alternate legs.

Referring to FIGS. 10 and 11, a ferrite block 4*a* is shaped into a form having a cross-section with a wide hollow 46 opening laterally and a narrow hollow 47 opening in a direction transverse to that of hollow 46. Both surfaces 6*a* and 7*a* at opposite sides of said wide hollow 46 are polished. Two such ferrite blocks 4*a* and 5*a* which are complementary in shape are bonded together at their polished surfaces 6*a* and 7*a* so as to form two magnetic gaps 2*a* and 8*a* in a way similar to that of the blocks shown in FIG. 3. A plurality of grooves 31*a*, 32*a*, . . . 36*a* are formed through said bonded blocks extending transversely to the bonded surfaces 2*a* and 8*a* so as to form a plurality of head tips 10*a*, 11*a*, . . . 16*a*. Said plurality of grooves 31*a*, 32*a*, . . . 36*a* is substantially equidistantly spaced and are each of the same size. Said plurality of grooves 31*a*, 32*a*, . . . 36*a* is filled with glass to form a plurality of glass spacers 21*a*, 22*a*, 23*a*, . . . 26*a*, in a manner similar to that of FIG. 5. After being cooled, the bonded ferrite blocks are cut at one side 44*a* on a plane parallel to the bottom face of said plurality of grooves and the opposite side 41*a* is shaped so as to form a convex surface which acts as a tape engaging surface. The thus formed ferrite blocks are divided into multichannel magnetic head elements each of which includes a given number of head tips. Each of the head tips has four legs as shown in FIG. 12.

Figure 13:
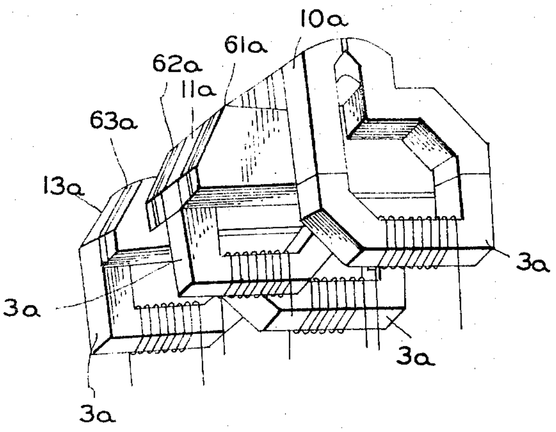
FIG. 13 is a perspective view of a finished 4-channel magnetic head in accordance with the present invention.

A back-core 3*a* wound with a winding is connected with alternate legs in each of said magnetic head tips with the back cores on adjacent head tips being offset laterally of the length of the blocks, as shown in FIG. 13. It is important that the wound back-cores are not directly adjacent the wound back-core on the adjacent magnetic head tip. The construction shown in FIG. 13 greatly reduces the cross-talk.

The other alternate two legs which are not connected with said wound back core are preferably cut off. Regardless of whether the other alternate two legs are cut off, the insertion of ferrite magnetic shields 61*a*, 62*a* . . . in a manner similar to that of FIG. 8 results in a further reduction of cross-talk.

In the above process, the forming of a given cross-section, polishing, grooving and cutting can be achieved by any suitable and available method and apparatus.

The following examples are meant to be illustrative of preferred embodiments of the invention, and are not meant to limit the scope thereof.

EXAMPLE 1

A mixture of 24% MnO, 24% ZnO, 52% $Fe_2O_3$, all percents being mole percents, is heated at 1,200°C for 2 hours and was hot-pressed at 1,350°C for 2 hours. The sintered ferrite body thus produced had a porosity of 0.1 percent, initial permeability of 20,000 (at 1KHz) and coercive force of 0.005 Oe. The ferrite body was fabricated into a 2-channel magnetic head like that shown in FIG. 1 in a manner as described above. The glass spacer 21 had a composition of 70.9% $SiO_2$, 16.4% $Na_2O$, 1.0% $K_2O$, 0.5% $Al_2O_3$, 0.3% $Sb_2O_3$, 5.0% CaO, 2.0% BaO and 3.9% MgO, all percents being by weight. The glass bonding was carried out by heating the ferrite blocks at 900°C for 20 minutes in $N_2$-gas atmosphere.

The width of head tips 10 or 11 is 600 microns and the width of spacer 21 was 300 microns.

An accelerated head-wearing test was carried out with a tape having a speed of 5 m/sec. relative to the head. After 100 hours, no defect had occured in the tape engaging surface. During a prolonged test of 1000 hours, the tape engaging surface of the head was worn down only several microns, but was perfectly even.

EXAMPLE 2

A 2-channel magnetic head having a shape as shown in FIG. 9 was made using the same materials and similar processes as in Example 1. The width of the head tips 10 and 11 and the width of the spacer 21 were exactly the same as in example 1. This example had a magnetic shield 61 inserted in the glass spacer 21. The magnetic shield 61 was composed of the same ferrite material used in the magnetic tips 10 and 11 and had a thickness of 150 microns. A cross-talk test based on a cassette-type audio-tape recorder showed that the head of Example 2 had a value of −40 dB cross-talk, while that of Example 1 had −20 dB cross-talk. The cross-talk value defined herein is the ratio of the output voltage from an adjacent channel signal on a tape to the out-put voltage from the tested-channel signal on a tape.

After 100 hours of a head wearing test as described in Example 1, the present head had no appreciable defects and had a perfectly even tape engaging surface.

EXAMPLE 3

A 4-channel magnetic head for use in 4 track-stereophonic cassette-tape recorders was made by using the same ferrite and glass materials as in Example 1 in a manner similar to that described above. This 4-channel head had a construction as shown in FIG. 13. The width of head tips was 600 microns and the distances between the 1st-channel and 2nd-channel heads and between the 3rd-channel and 4th-channel heads was 300 microns. A stereophonic signal was recorded and reproduced using a pair of 1st and 2nd-channel heads and a pair of 3rd- and 4th-channel heads. The spacing between the 2nd- and 3rd-channel heads was 650 microns. The width of each magnetic shield was 200 microns. The magnetic gap widths of the four channel heads was essentially the same and was 1.0 micron.

In this 4 track-4 channel head, values of the cross-talk characteristics between the 1st- and 2nd-channel and between the 3rd- and 4th-channel were about −40 dB and between the 2nd- and 3rd-channel was −55 dB. Other electrical characteristics of this head were as follows:

Reproducing out-put voltage = −60 dB at 1 KHz (0 dB=1 volt),

Upper limit frequency = 20 KHz.

These data were measured by using a cassette-type tape recorder with relative tape-head speed of 4.75 cm/sec and bias current of 300 mA at 80 KHz.

This head also was tested for wear resistance in a manner as described in Example 1. After a 100 hour wearing test, no defect was found in the tape engaging surface.

What is claimed is:

1. A method of making a multichannel magnetic head comprising forming two hollows in each of a pair of ferrite blocks, a laterally opening hollow opening out of one surface of each block and a hollow opening out of a surface of each block which is perpendicular to said one surface; polishing the pairs of surfaces on opposite sides of said laterally opening hollows in each block; bonding the pair of said hollowed and polished ferrite blocks by glass bonding the corresponding polished surfaces to each other so as to form two magnetic gaps; forming a plurality of grooves through the bonded blocks transversely to the bonded surfaces so as to form a plurality of head tips, said plurality of grooves being substantially equidistantly spaced along the blocks and each having the same size; heating the bonded blocks having said plurality of grooves formed therethrough; filling said plurality of grooves with molten glass to form a plurality of glass spacers; cutting one side of said bonded blocks in a plane parallel to the bottom face of said plurality of grooves to leave a series of head elements separated by glass spacers and each having an inner leg and an outer leg on each side of the plane of the magnetic gaps; shaping the side of the bonded blocks opposed to said one side so as to have a convex surface which acts as a tape engaging surface; dividing the shaped blocks into multichannel magnetic head elements, each of which includes a plurality of head tips;

attaching to an inner leg on one side and an outer leg on the other side of each head tip a back-core having windings wound thereon; and attaching the back-cores in adjacent head tips in positions offset from each other transversely of said hollows.

2. A method for making a multichannel magnetic head as claimed in claim 1 further comprising cutting off the inner leg and outer leg of each head element to which said back core is not attached.

3. A method of making a multichannel magnetic head as claimed in claim 1 further comprising inserting a thin ferrite plate into each of said plurality of grooves in a position parallel to the groove, and thereafter filling the grooves with molten glass which surrounds said thin plates.

* * * * *